United States Patent [19]

Müller et al.

[11] 4,043,825

[45] Aug. 23, 1977

[54] PRODUCTION OF FOAMED GYPSUM MOLDINGS

[75] Inventors: Martin Müller, Krefeld; Friedrich Hinsche, Leverkusen; Gerhard Winter, Krefeld; Karl Brändle, Leverkusen, all of Germany

[73] Assignee: Bayer Aktiengesellschaft, Leverkusen, Germany

[21] Appl. No.: 604,868

[22] Filed: Aug. 14, 1975

[30] Foreign Application Priority Data

Sept. 3, 1974  Germany ................ 2442098

[51] Int. Cl.$^2$ .............................. C04B 11/00
[52] U.S. Cl. .................... 106/87; 106/109; 106/110; 106/122
[58] Field of Search ........... 106/109, 110, 122, 87

[56] References Cited

U.S. PATENT DOCUMENTS

| 2,662,825 | 12/1953 | Kauffmann | 106/87 |
| 3,688,437 | 9/1972 | Hamrin | 106/122 |

FOREIGN PATENT DOCUMENTS

| 176,493 | 10/1953 | Austria |
| 928,039 | 5/1955 | Germany |

*Primary Examiner* — Patrick P. Garvin
*Assistant Examiner* — John P. Sheehan
*Attorney, Agent, or Firm* — Burgess, Dinklage & Sprung

[57] ABSTRACT

In the production of a gypsum-based porous body of high strength by foaming a gypsum-water mixture containing alkali, hydrogen peroxide and a decomposition catalyst therefor, the improvement which comprises including in said mixture an acid-reacting compound with active hydrogen atoms in a quantity insufficient for complete neutralization of the alkali. The alkali is preferably calcium and/or magnesium oxide and/or hydroxide and the preferred acid-reacting compounds are phosphates and/or sulfates, especially potassium hydrogen phosphates. The acid-reacting compound is employed in an amount sufficient to neutralize about 5 to 50% of the alkali, the final pH being about 12 to 12.5.

9 Claims, No Drawings

PRODUCTION OF FOAMED GYPSUM MOLDINGS

This invention relates to a process for the production of porous bodies based on gypsum, more especially anhydrite, by liberating oxygen from hydrogen peroxide in an alkaline binder suspension. The suspension is cast, foams slowly and uniformly and sets with the pore structure intact.

The foaming of aqueous suspensions of calcium sulfate semihydrate, which is known as plaster of Paris, or of anhydrous calcium sulfate, known as anhydrite, is known in principle. Thus, it is possible, by mixing a gypsum pulp and an aqueous foam, prepared separately therefrom, to obtain a mass permeated by air bubbles which sets with the pore structure substantially intact. The disadvantages of this process include the partial collapse of the pore structure when the two components are mixed, and the fact that the process can only be carried out in batches because the foamed mass can only be conveyed with further collapse of the pore structure.

In other known processes, a gas is produced in the pulp by a chemical reaction, the required pore structure subsequently being formed by this gas. It is preferred to produce carbon dioxide as the blowing gas by reacting carbonates with acids or acid-reacting salts such as, for example, aluminum sulfate. Naturally, these processes are carried out in an acid medium at a pH value below 7 (German DAS 1,300,459 and 1,571,575).

It is also known that hydrogen peroxide can be catalytically decomposed in an alkaline medium, oxygen being given off (U.S. Pat. No. 2,662,825; German Pat. No. 928,039; Austrian Pat. No. 176,493). Manganese dioxide, manganese sulfate and manganese chloride are used as catalysts. Decomposition, which takes place spontaneously, gives rise to considerable difficulties in coordinating the end of foam formation with the beginning of setting. In the case of non-stabilized foams, overrapid gas evolution results readily in the collapse of the foamed mass. If, by contrast, the evolution of gas is not complete by the time setting begins, an inhomogeneous body of low strength permeated by cracks is formed. It is difficult to achieve uniform properties in the products.

A foaming wetting agent is used to promote foam formation, preferably during the separate production of an aqueous foam (Austrian Pat. No. 176,493). According to German DOS 2,056,255, pore formation is obtained by stirring air into a gypsum pulp containing an addition of, for example, an alpha-olefin sulfate. However, even in cases where this wetting agent is used, the effect obtained is only minimal because the density of the porous gypsum thus produced is only slightly different from the value obtained taking into account the evaporated excess of water. The use of a wetting agent in the gypsum pulp is obviously not sufficient for the production of a stable foam.

The object of the present invention is to provide porous bodies based on gypsum and a process for their production, in which the requirements referred to above are satisfied and the disadvantages of conventional processes are overcome. More specifically, the object of the invention is to provide porous bodies in which the formation and setting of a foamed mass can be strictly co-ordinated with one another in terms of time.

In the context of the invention, the expression "gypsum" is used for completely and partly dehydrated calcium sulfate hydrates which have the property of setting in the presence of water. In other words, the expression gypsum covers, for example, the semihydrate $CaSO_4.\frac{1}{2} H_2O$, plaster of Paris, and also the anhydrous forms $CaSO_4$, screened gypsum and the synthetic and natural anhydrite. Plaster of Paris normally contains somewhat less water than the so-called semihydrate, although it is also known as semihydrate. In the context of the invention, the expression "semihydrate" is used as a generic expression and includes plaster of Paris (cf. in this connection the nomenclature laid down in DIN 1168 and DIN 4208).

According to the invention, this object is achieved by adding acid compounds containing active hydrogen atoms to the mixture of anhydrite and/or gypsum containing alkaline constituents. In this way, it is possible to control the pH-value of the suspension in the required manner and to decompose the hydrogen peroxide added for foaming under control. The aqueous suspension foams slowly and, on completion of foaming, sets with the pore structure intact.

Accordingly, the invention relates to a process for the production of porous bodies based on gypsum with high strength and a uniform pore structure by foaming a gypsum-water mixture, to which diluents, fillers, dyes, wetting agents and/or additives for influencing setting and flow properties may optionally be added, by the catalytic decompositions of hydrogen peroxide or its compounds, distinguished by the fact that gypsum and/or anhydrite containing alkaline constituents is suspended in an aqueous solution in the presence of hydrogen peroxide, brought into any form and foamed, the aqueous solution containing water-soluble acid compounds with active hydrogen atoms in a quantity which is not sufficient for complete neutralization.

The difficulties involved in foaming binder suspensions by the decomposition of hydrogen peroxide lie above all in the choice of the pH-value. Although an excessively alkaline medium has a favorable effect upon the hydration and strength development of the binder, hydrogen peroxide is decomposed too quickly and spontaneously in this case. In the neutral range, decomposition takes place too slowly, while in the presence of catalysts, for example manganese salts, it takes place too quickly and almost uncontrollably. Decomposition in acid solution is not suitable because, in this case, end products of low strength are obtained and the residual acidity left in the product cannot be accepted.

Accordingly, the acid compounds should preferably be added in such a quantity that the suspension has a final pH-value in the range of from about 10 to 13.

Since the pH-value can be controlled in regard to time through the type and quantity of the acid-reacting substances used, it is possible to keep the evolution of gas under control. Accordingly, foaming can be strictly co-ordinated with the setting properties of the binder.

It is preferred to use water-soluble monohydrogen and dihydrogen phosphates, optionally with an addition of water-soluble hydrogen sulfates.

The mixture should show an alkaline reaction in aqueous suspension. Synthetic anhydrite normally contains about 0.3 to 3% of calcium oxide or an equivalent quantity of calcium hydroxide. In all other cases, basic constituents are added. The calcium sulfate material should contain at least 0.1% of CaO or an equivalent quantity of corresponding bases such as, for example, $Ca(OH)_2$.

This proportion is highly variable, the only requirement being that the mixture to be foamed should have a pH-value of about 10 to 13, preferably about 12 to 12.5, in aqueous suspension. MgO or Mg(OH)$_2$ may also be used as the basic constituent.

Through the retarded pH-development and decomposition of hydrogen peroxide or its derivatives, for example peroxides or H$_2$O$_2$-addition compounds, the mixture to be foamed may be thoroughly suspended in conventional mixers. The liquid mixture is introduced as required into a mold to be filled with foam and begins to grow slowly after the particular time interval adjusted. Growth may last from 30 to 60 minutes. Thereafter the foamed mass is still fluid and begins to set with its volume and pore structure intact.

The pH-development of the suspension into the alkaline range is preferably extended to a period determined both by the mixing conditions and by the dimensions of the mold to be filled.

The process may be carried out either continuously or in batches. In cases where it is carried out in batches, an aqueous solution containing the active substances in accordance with the invention is preferably introduced initially, the binder is stirred in and the whole is thoroughly mixed. The hydrogen peroxide solution may be added at any stage or even to the aqueous solution.

In cases where the process is carried out continuously, the aqueous solution and the binder mixture are continuously combined and mixed. The suspension is then run off continuously and introduced into the mold to be filled.

It is possible, although in principle not essential for carrying out the process, to add a variety of different auxiliaries. For example, it is possible to use catalysts, such as heavy metal salts, for the decomposition of hydrogen peroxide.

Acid compounds suitable for use in the process according to the invention are, above all, monohydrogen and dihydrogen phosphates.

The phosphates used should be adequately soluble in water. Suitable phosphates are, for example, monohydrogen and dihydrogen phosphates of the elements of the first to third Group of the Periodic System, such as for example KH$_2$PO$_4$, K$_2$HPO$_4$, NaH$_2$PO$_4$, Na$_2$HPO$_4$ and Ca(H$_2$PO$_4$)$_2$. Ammonium hydrogen phosphates, aluminum hydrogen phosphates such as, for example, Al[H$_2$(PO$_4$)]$_3$ are suitable, as are acids of phosphorus. However, the monohydrogen and dihydrogen phosphates are preferably used.

Acid sulfates, for example NaHSO$_4$ or KHSO$_4$, may also be used together with the phosphates.

In addition to the above-mentioned compounds, however, it is possible to use substances such as, for example, oxalic acid, amino trimethylene phosphonic acid or acid mixtures (such as for example H$_3$PO$_4$/citric acid).

The substances active in accordance with the invention are used in a quantity which is not sufficient for completely neutralizing the alkaline constituents present in the anhydrite-gypsum material. The possible degree of neutralization amounts to between about 2 and 60% and preferably to between about 5 and 50%. Following addition of the acid substances, the aqueous suspension should reach a pH-value of from about 10 to 13, preferably around 12.

In the case of a CaSO$_4$-material containing up to about 2% of CaO, it has proved to be sufficient to add, for example, about 0.2 to 0.6% of the acid substances, corresponding to a possible degree of neutralization of less than about 20%.

Suitable catalysts are, above all, manganese compounds, for example manganese sulfate and manganese chloride. Manganese compounds soluble in the alkaline medium, for example manganates and permanganates, are particularly effective. The catalysts may be added to the gypsum in solid form, although they are preferably added to the gypsum suspension in the form of an aqueous solution. The catalysts are thoroughly mixed with the material in order to guarantee uniform evolution of oxygen. The quantities used are governed by the effectiveness of the particular catalyst. For example, about 0.1 to 0.5 part of KMnO$_4$ are added to about 100 parts of gypsum. 0.3 part of KMnO$_4$, about 1 part of MnSO$_4$ or MnCl$_2$ or 3 parts of manganese dioxide are equally effective.

It is also possible to use conventional activators such as, for example, potassium sulfate for synthetic anhydrite or silica sol for plaster of Paris, which additionally influence the setting behavior of the anhydrite-gypsum mixture in the particular manner required.

In addition, the flow properties may be influenced by the addition of so-called plasticizers such as, for example, modified melamine resins, cellulose ethers, etc.

Surface-active substances which promote foam formation are preferably added to the mixture.

The proportion amounts to about 0.01 to 0.1 part of wetting agent, based on 100 parts of the dry mixture. Wetting agents based on alkyl sulfonates are particularly suitable.

The gypsum is used in the form of completely or partly dehydrated calcium sulfates which set in the presence of water, i.e. for example semihydrate or plaster of Paris or synthetic or natural anhydrite. Synthetic anhydrite is formed, for example, in large quantities in the production of hydrofluoric acid from fluorspar and sulfuric acid where it accumulates in the form of so-called cinders. It is also possible to use mixtures of semihydrate and anhydrite in any ration. It is preferred to use mixtures containing up to about 50% of semihydrate, anhydrite-semihydrate mixtures containing about 10 to 40% of semihydrate plaster of Paris for adjusting their setting properties being particularly suitable. However, it is also possible to use gypsum in admixture with other inorganic binders.

It is also possible to add conventional additives (fillers and diluents) such as sand, calcium sulfate dihydrate, expanded clay, pumice, cork, plastic granulate, glass fibers, glass wool, mineral wool, organic fibers, foamed glass particles and also pigments.

The only requirement is that these additives should be system-compatible, i.e. substantially alkali-resistant. It is also possible to add auxiliaries which influence setting behavior such as, for example, activators or retarders, such as for example carboxymethyl cellulose. Masses with a plasticizing or thickening effect, i.e. masses which influence the processibility and the pore structure of the foamed mass, may be added to the gypsum suspension. Suitable masses of this kind are organic and inorganic additives, for example styrene- or formaldehyde-containing polymers and condensates, especially with sulfonated groups, and also sols containing colloidal silica as plasticizers. Suitable thickeners are, for example, cellulose derivatives or inorganic compounds based on clay. In addition to the possibility of obtaining an increase in the strength of the products by using plasticizers because of the water saved, it is possible to use plasticizers and thickeners, more especially from the point of view of processing. Thus, plasticizers enable complicated molds to be completely and properly filled, while thickeners are able for example to reduce the requirements on the imperviousness of formwork.

Coloring is possible by the addition of dyes or pigments, for exammple to the suspension (homogeneous coloring or by appropriate aftertreatment.

Hydrophobizing and increasing water resistance, for example on the basis of silicone oils, may be obtained by additions to the suspension or by appropriate aftertreatment.

Although it is not essential to use surface-active substances as foam stabilizers for carrying out the process, it can be advantageous to use such stabilizers in cases where the foaming of foamed mass is subjected to fairly intense movement, such as pumping, conveying or re-casting. It is preferred to use surfactants which are anion-active or nonionic in the alkaline range.

Various types of fillers may also be incorporated, for example inorganic or organic substances in powder, fiber or granulate form. Mineral fibers, packings, wood waste or rubber granulates are mentioned by way of example.

fireproof materials are required. They are completely non-inflammable, unaffected by periodic freezing and do not give off any gases when heated. They do not require high material and manufacturing costs and show outstanding strength and limited brittleness. Since the foamed mass is cast in liquid form and sets cold, the process may be carried out in situ. It is possible, for example, to fill gaps and cavities. The mass is preferably cast in the form of a heat-insulating and sound-insulating layer.

The process according to the invention is illustrated by the following Examples.

EXAMPLE 1

500 g of anhydrite binder according to DIN 4208 (CaO-content: 1.2% by weight) and the particular quantity indicated in the Table of active substance are suspended in 250 ml of water. The dependence of the pH-value upon time is measured. Whereas the anhydrite suspension reaches a pH-value of 12 after only 4 seconds without the addition, addition of the substances indicated in the Table considerably delays reaching of the pH-value of 12. Phosphates are particularly effective.

| Test No. | Active substance | Quantity (g) | Quantity (mole) | % possible neutralization of the CaO | pH after 1 minute | time (mins) required to reach pH 12 |
|---|---|---|---|---|---|---|
| 1 | $NaHSO_4$ | 12.5 | 0.104 | 48.6 | 6.5 | 22 |
| 2 | $Ca(H_2PO_4)_2$ | 1.0 | 0.0043 | 4 | 6.2 | 18 |
| 3 | $KHSO_4/(NH_4)_2HPO_4$ | 12.5/ 1.0 | 0.092/ 0.0076 | 43.0/ 3.6 | 5.7 | 13 |
| 4 | $Al(H_2PO_4)_3$ | 1.2 | 0.0038 | 7.5 | 6.2 | 14 |
| 5 | $KH_2PO_4$ | 1.5 | 0.0077 | 7.2 | 6.6 | 13 |
| 6 | $H_3PO_4$/citric acid | 0.5/ 2.0 | 0.0061/ 0.0111 | 8.55/ 15.6 | 6.7 | 6 |
| 7 | oxalic acid | 5.0 | 0.0556 | 52.0 | 5.4 | 11 |
| 8 | aminotrimethylene phosphonic acid | 5.0 | 0.036 | 33.7 | 7.0 | |

The porous bodies obtained after complete setting and drying (approximately 5 days) show excellent strength properties. Their compressive strength amounts to between about 3 and 50 kp/cm² in dependence upon the particular unit weight. The unit weight may be varied within wide limits through the quantity of hydrogen peroxide used and amounts to between about 50 and 1000 and preferably to between about 200 and 800 kg/m³. The pores are uniformly distributed and have a uniform size of about 0.1 to 4 mm, preferably about 0.2 to 2mm.

The following table for example shows a few representative properties:

| Property | Unit weight of the porous body | | |
|---|---|---|---|
| | 250 kg/m³ | 500 kg/m³ | 750 kg/m³ |
| Compressive strength according to DIN 1164 in kp/cm² | 4–5 | 18–22 | 43–47 |
| Bending tensile strength according to DIN 1164 in kp/cm² | 3–4 | 8–10 | 15–17 |
| Thermal conductivity according to DIN 56212 in kcal/m.h. ° C | 0.08–0.09 | 0.16–0.17 | 0.25–0.26 |
| Dimensional stability under heat according to DIN 53424 | no measurable change | | |

The porous bodies produced in accordance with the invention may be used, for example, in the form of blocks bricks or panels as lightweight building materials and insulating materials, more especially in cases where

Comparison Example *a*

500 g of anhydrite binder containing approximately 1.2% by weight of CaO are suspended in 200 ml of water. The pH-value rises to approximately pH 12 within a few seconds. $H_2O_2$ added begins to decompose violently. In experiments to produce a foam in this way, a body of high density (0.8 – 1.0 g/cc) with a few irregular large pores is formed after the violent foaming and substantial collapse of the mass. Systematic, reproducible working is not possible. It is not possible to produce controlled products.

EXAMPLE 2

A mixture is prepared from:
2100 g of plaster of Paris,
4900 g of anhydrite binder (containing approximately 1.2% by weight of CaO),
21 g of $KH_2PO_4$,
100ml of $H_2O_2$ (35%),
10 g of $MnO_2$, and
3200ml of $H_2O$ The components are suspended over a period of 10 minutes. The suspension with a pH-value of approximately 6.5 is introduced into form work. The mass begins to foam after about 2 minutes, grows to more than twice its original volume in 12 minutes and begins to set after 16 minutes with its volume intact. The body formed has fine uniform pores and, after drying, has a compressive strength of 370 N/cm$^2$ and a density of 0.65 g/cc.

Comparison Example b

For comparison, a mixture is prepared from:
350 g of plaster of Paris,
740 g of anhydrite binder (containing approximately 1.2% by weight of CaO),
7.5 g of K$_2$SO$_4$ (as activator for anhydrite), and
500ml of H$_2$O.

50 ml of H$_2$O$_2$ (35%) are added over a period of 30 seconds during mixing (10 minutes). The foaming mass is introduced into a mold with a pH-value of about 12, grows for 30 seconds and hardens quickly with a heat effect. The body formed has a density of 0.7 g/cc, is permeated by fractures and can be readily crushed by hand. On account of the inhomogeneous structure and limited mechanical strength, it was not possible to determine any values.

EXAMPLE 3

A mixture is prepared from:
7000 g of anhydrite binder (containing approximately 1.2% by weight of CaO),
175 g of KHSO$_4$,
14 g of (NH$_4$)$_2$HPO$_4$,
100ml of H$_2$O$_2$ (35%), and
2100 ml of H$_2$O.

The components are mixed over a period of 3 minutes and introduced into a mold in the form of a suspension with a pH-value of 7. The mass begins to grow after a few minutes, its growth being complete after about 8 to 9 minutes. A pH-value of 9 is reached after 5 minutes. The set body shows a homogeneous fine pore structure and has a compressive strength of 265 N/cm$^2$ and a unit weight of 590 kg/m$^3$.

Comparison Example c

For comparison, a mixture is prepared from:
7000 g of anhydrite binder (containing approximately 1.2% by weight of CaO),
175 g of K$_2$SO$_4$ (as activator for anhydrite)
200 ml of H$_2$O$_2$ (35%), and
2400ml of H$_2$O.

The components are mixed over a period of about 30 seconds. The foaming mixture is then introduced into a mold with a pH-value of 12. Growth lasts 1 minute 50 seconds. The body formed has a unit weight of 730 kg/m$^3$ and a compressive strength of 134 N/cm$^2$, i.e. by comparison with Example 3 30% more unit weight and only 50% of the strength value.

EXAMPLE 4

After stirring for 3 minutes, the following mixture is poured into form work 45 cm wide, 7 cm deep and 200 cm tall:
9.6 kg of plaster of Paris,
22.4 kg of anhydrite binder (containing approximately 1.2% by weight of CaO),
96 g of KH$_2$PO$_4$,
70 g of MnO$_2$,
19.5 l of H$_2$O,
0.490 l of H$_2$O$_2$ (35%), and
32 g of plasticizer (maleic acid anhydride-styrene copolymer). The mixture fills about half the mold and grows uniformly over a period of 25 minutes up to the upper edge of the mold. A few minutes later it hardens. The completed molding can be removed from the mold after 35 minutes.

EXAMPLE 5

Various materials are inserted as inner linings into the form work described in Example 4:
an enamelled panel
a sheet of Plexiglas treated with release oil
cardboard impregnated with waterglass
stretch-cotton fabric The mold is coated with a mixture as described in Example 4.

Following removal of the form work, the impregnated cardboard and cotton fabric adhered firmly to the foamed body. The parts in which Plexiglas treated with release oil or enamel was used can be separated very easily from the form work and show smooth, solid surfaces.

EXAMPLE 6

Two foam bodies with a unit weight of 255 kg/m$^3$ are produced from the same mixture as described in Example 2, but with a little more H$_2$O$_2$.

Only 1% by weight of a standard commercial-grade impregnating agent based on silicone oil (sodium methyl siliconate) is added to and stirred into one mixture for impregnation. The following comparison test is carried out with prisms having a volume of about one-half liter:
1. Immersing the bodies in water and measuring the amount of water taken up.
2. Measuring the rate at which the water is given off during subsequent drying.

|  | Body 1 without silicone | Body 2 with silicone |
|---|---|---|
| Initial weight | 196.8 g | 186.0 g |
| Weight after immersion | 408.6 g | 253.5 g |
| Water uptake | 107.6 % | 36.3 % |
| Residual water after |  |  |
| 2 h | 82.6 % | 16.5 % |
| 8 h | 70.5 % | 4.5 % |
| 24 h | 49.0 % | — |
| 50 h | — | — |

The impregnated body 1 takes up about 66% less water than body 2 and quickly gives off the water taken up.

EXAMPLE 7

10 g of a 50% Al(H$_2$PO$_4$)$_3$-solution and 1.5 g of phthalocyanine (Helioechtviolett) are dissolved in 1000 ml of water, and a mixture of 1500 g of plaster of Paris and 8 g of CaO is stirred into the resulting solution. After 45 seconds, 15 ml of 35% hydrogen peroxide are added. After the H$_2$O$_2$ has been stirred in, the suspension is introduced into a mold. The pH-value of the suspension amounts to 7 after 1 minute, to 10 after 10 minutes and to 11 after 30 minutes. In the meantime the foam grows to twice the volume of the suspension. After hardening and drying, the foam body has a unit weight of 0.43 g/cc and a compressive strength of 120 N/cm$^2$. It is uniformly violet in color. The color finish is water-resistant.

EXAMPLE 8

Continuous working:

The components are mixed continuously in a vessel with a bottom outlet. The suspension is transported through a vibrating chute at a controlled rate of 500 g/minute. The metering of the solution is adjusted to 250 ml/minute through a second hose pump followed by a rotameter.

The binder used is a mixture of anhydrite binder and gypsum (70 parts of anhydrite and 30 parts of gypsum) to which a little $MnO_2$ is added as a decomposition catalyst. The solution contains the following substances, based on 10 l of $H_2O$:

400 ml of $H_2O_2$ (35%)
100 g of $KH_2PO_4$
300 g of $K_2SO_4$
20 g of a standard commercial-grade retarder (Retardan)
50 g of a plasticizer based on a maleic acid anhydride/styrene copolymer After 20 minutes, a volume of 25 liters has been foammed. The hardened foam body has a density of 0.45 g/cc following the removal by drying of excess water.

It will be appreciated that the instant specification and examples are set forth by way of illustration and not limitation, and that various modifications and changes may be made without departing from the spirit and scope of the present invention.

What is claimed is:

1. In the production of a gypsum-based porous body of high strength by foaming a gypsum-water mixture containing alkali, hydrogen peroxide and a decomposition catalyst therefor, the improvement which comprises including in said mixture an acid reacting compound with active hydrogen atoms in a quantity sufficient to bring the final pH of the mixture to about 12 to 12.5, said acid reacting compound being an acid, an ammonium salt or a salt of a metal of the first or second Main Group of the Periodic System.

2. A process as claimed in claim 1, wherein a water-soluble monohydrogen or dihydrogen phosphate is used as the acid-reacting compound.

3. A process as claimed in claim 2, wherein the monohydrogen or dihydrogen phosphate of a metal of the first or second Main Group of the Periodic System is used as the acid-reacting compound.

4. A process as claimed in claim 3, wherein $KH_2PO_4$ or $K_2HPO_4$ is used as the acid-reacting compound.

5. A process as claimed in claim 1, wherein a hydrogen sulfate is used as the acid-reacting compound.

6. A process as claimed in claim 1, wherein the alkali is at least one of CaO, $Ca(OH)_2$, MgO and $Mg(OH)_2$ and the acid-reacting compound is added in a quantity sufficient to neutralize about 2 to 60% of the alkali.

7. A process as claimed in claim 1, wherein a hydrophobizing substance is added to the mixture.

8. A process as claimed in claim 7, wherein the alkali is at least one of CaO, $Ca(OH)_2$, MgO and $Mg(OH)_2$ and the acid-reacting compound is $KH_2PO_4$ employing in quantity sufficient to neutralize about 5 to 50% of the alkali.

9. A foamed body produced by the process of claim 1.